United States Patent
Mick et al.

(10) Patent No.: US 7,461,509 B2
(45) Date of Patent: Dec. 9, 2008

(54) METHOD AND SYSTEM FOR DETERMINING LEAN BLOW OUT CONDITION FOR GAS TURBINE COMBUSTION CANS

(75) Inventors: Warren James Mick, Altamont, NY (US); George Edward Williams, Niskayuna, NY (US); Fei Han, Clifton Park, NY (US); Eamon Patrick Gleeson, Atlanta, GA (US); Shiva Srinivasan, Greer, SC (US); Scott Alan Kopcho, Atlanta, GA (US); Ilan Leibu, Marietta, GA (US)

(73) Assignee: General Electric Company, Schenectady, NY (US)

( * ) Notice: Subject to any disclaimer, the term of this patent is extended or adjusted under 35 U.S.C. 154(b) by 650 days.

(21) Appl. No.: 10/908,309

(22) Filed: May 6, 2005

(65) Prior Publication Data
US 2006/0248893 A1 Nov. 9, 2006

(51) Int. Cl.
*F02C 7/00* (2006.01)
(52) U.S. Cl. ....................................... 60/779
(58) Field of Classification Search .............. 60/776, 60/779, 39.281; 73/23.32, 116, 117.2, 118.1; 701/103
See application file for complete search history.

(56) References Cited

U.S. PATENT DOCUMENTS

| | | | | |
|---|---|---|---|---|
| 5,303,684 | A * | 4/1994 | Brown et al. | 123/435 |
| 5,857,339 | A | 1/1999 | Roquemore et al. | 60/749 |
| 6,463,730 | B1 | 10/2002 | Keller et al. | 60/39.24 |
| 6,694,832 | B1 | 2/2004 | Gleeson | 73/866.5 |
| 6,705,081 | B2 | 3/2004 | Kamen et al. | 60/521 |
| 6,708,568 | B2 | 3/2004 | Gleeson et al. | 73/756 |
| 7,089,746 | B2 * | 8/2006 | Lieuwen et al. | 60/779 |
| 7,278,266 | B2 * | 10/2007 | Taware et al. | 60/773 |
| 2002/0002817 | A1 | 1/2002 | Keller | 60/39.02 |
| 2003/0226392 | A1 | 12/2003 | Naumiec et al. | 73/1.71 |
| 2004/0024516 | A1 | 2/2004 | Hook et al. | 701/100 |
| 2004/0088060 | A1 | 5/2004 | Renou et al. | 700/30 |
| 2004/0168520 | A1 | 9/2004 | Gleeson et al. | 73/756 |

* cited by examiner

*Primary Examiner*—Devon C Kramer
*Assistant Examiner*—Gerald L Sung
(74) *Attorney, Agent, or Firm*—Cantor Colburn LLP

(57) ABSTRACT

A method for determining a lean blow out condition for a combustor. In an exemplary embodiment, the method includes determining acoustical frequency data for the combustor, determining a combustor flame temperature based on the acoustical frequency data, determining an existing fuel/air ratio in the combustor based on the combustor flame temperature, and comparing the existing fuel/ratio to a lean blow out fuel/air ratio. A lean blow out condition for the combustor is indicated when the existing fuel/air ratio is about equal to the lean blow out fuel/air ratio.

20 Claims, 9 Drawing Sheets

FIG. 2

| Can | Frequency | Delta |
|---|---|---|
| Freq1 | 1026.64 | 6.26 |
| Freq2 | 1039.16 | 18.78 |
| Freq3 | 1020.38 | 0 |
| Freq4 | 1020.38 | 0 |
| Freq5 | 1020.38 | 0 |
| Freq6 | 995.34 | -25.04 |
| Freq7 | 1032.9 | 12.52 |
| Freq8 | 1020.38 | 0 |
| Freq9 | 1014.12 | -6.26 |
| Freq10 | 1007.86 | -12.52 |
| Freq11 | 1014.12 | -6.26 |
| Freq12 | 1032.9 | 12.52 |
| Freq13 | 1014.12 | -6.26 |
| Freq14 | 1020.38 | 0 |
| Median | 1020.38 | 0 |

METHOD AND SYSTEM FOR DETERMINING LEAN BLOW OUT CONDITION FOR GAS TURBINE COMBUSTION CANS

BACKGROUND OF THE INVENTION

The present disclosure relates generally to industrial power plant machinery and, more particularly, to a method and system for determining a lean blow out condition for gas turbine combustion cans.

Gas turbines generally include a compressor and turbine arranged on a rotating shaft(s), and a combustion section between the compressor and turbine. The combustion section burns a mixture of compressed air and liquid and/or gaseous fuel to generate a high-energy combustion gas stream that drives the rotating turbine. The turbine rotationally drives the compressor and provides output power. Industrial gas turbines are often used to provide output power to drive an electrical generator or motor. Other types of gas turbines may be used as aircraft engines, on-site and supplemental power generators, and for other applications. Certain gas turbines include several tangentially located combustor cans that burn fuel in high-pressure compressed air to isobarically raise the temperature of the resulting gaseous mixture. The resulting hot gas is fed to a multi-stage turbine (known to those skilled in the art as a combination of nozzles and buckets, or stators and rotors in each stage), where the gas performs the work for generating electricity, for example.

Fuel and air flow rates are controlled in order to allow for ignition of a flame in the burner as well as for clean emissions after ignition. A burner controller is used to control the fuel and air flow rates provided by a fuel regulator and blower, respectively. The fuel regulator is typically set to an initial value for ignition. Once the flame is proved, the burner controller varies the fuel flow rate to control the heater head temperature, as measured by a head temperature sensor. A flame is proved when a flame detector detects the presence of the flame. There are several types of flame detectors including thermocouples and ultraviolet sensors known in the art.

The output (or air mass flow rate) of the combustion air blower is set by the burner controller to control the fuel-air ratio in the combustion chamber. The fuel-air ratio is the ratio of the fuel mass flow rate to the air mass flow rate and is a primary factor affecting emissions. The blower controls the fuel-air ratio by increasing or decreasing the air mass flow rate relative to the fuel mass flow rate. For example, in order to hold the fuel-air ratio constant, the burner controller will increase the blower output as the fuel regulator increases its output and vice versa. The desired fuel-air ratio and the fuel flow rate may be changing at the same time, so the burner controller will change the output of the blower to accommodate both the change in desired fuel-air ratio and the fuel flow rate.

Minimizing the emissions of carbon monoxide (CO), hydrocarbons (HC) and oxides of nitrogen (NOx) requires a lean fuel-air mixture that still achieves complete combustion. A lean fuel-air mixture has more air than a stoichiometric mixture (i.e., 15.67 grams of air per gram of fuel, if propane is used, for example). However, as more air is added to a fixed amount of fuel, the emissions of CO, HC and $NO_x$ will decrease until the fraction of air in the fuel-air mixture is large enough that the flame becomes unstable. At this point, pockets of the fuel-air mixture will pass through the burner without complete combustion. Incomplete combustion of the fuel-air mixture produces large amounts of CO and HC, which will quickly increase as more air is added to the fuel-air mixture until the flame extinguishes at a lean blow-out limit ("LBO"). The LBO will increase as the temperature of the incoming air (i.e., the preheated air) increases.

The fuel-air ratio must first be controlled to provide the optimal fuel-air ratio for ignition. Once the flame is proved, the fuel-air ratio is controlled to minimize emissions based upon the temperature of the preheated air and the fuel type. When the fuel flow rate is increased or decreased to adjust the temperature of the heater head, the air flow rate is also adjusted to maintain the desired fuel-air ratio.

A given fuel will only ignite over a limited range of fuel-air ratios. At ignition, an ignition fuel-air ratio is chosen which is slightly above or below the stoichiometric fuel-air ratio corresponding to the fuel being used. As mentioned above, use of a lean fuel-air mixture minimizes the emissions of carbon monoxide (CO), hydrocarbons (HC) and oxides of nitrogen ($NO_x$). Typically, however, lighting a lean pre-mixed fuel-air mixture can be difficult.

Accordingly, it would be desirable to have a real time method for determining and predicting when a combustor is running close to its lean blow out limit, and thereafter generate an automated warning signal such that either manual or automated corrective action can be taken to correct the problem and prevent blowing out of the combustion system.

BRIEF DESCRIPTION OF THE INVENTION

The above discussed and other drawbacks and deficiencies of the prior art are overcome or alleviated by a method for determining a lean blow out condition for a combustor. In an exemplary embodiment, the method includes determining acoustical frequency data for the combustor, determining a combustor flame temperature based on the acoustical frequency data, determining an existing fuel/air ratio in the combustor based on the combustor flame temperature, and comparing the existing fuel/ratio to a lean blow out fuel/air ratio. A lean blow out condition for the combustor is indicated when the existing fuel/air ratio is about equal to the lean blow out fuel/air ratio.

In another aspect, a method for determining a lean blow out condition for a combustor includes gathering dynamic pressure data for each of a plurality of combustor cans, determining frequency spectral data from the dynamic pressure data, and determining a peak frequency, within an acoustical frequency range, for each of the combustor cans, the peak frequencies indicative of an operating temperature within corresponding combustor cans. A median frequency is determined for the peak frequencies, and the median frequency is subtracted from the peak frequencies for each of the combustor cans. A resulting differential frequency value therebetween is compared to a calculated first blow out alarm level, the first blow out alarm level corresponding to a frequency less than that of the median frequency. A first alarm level indication for a given combustor can is generated whenever the differential frequency value for the given combustor can is less than or equal to the first blow out alarm level.

In still another aspect, a system for determining a lean blow out condition for a combustor includes a sensing device configured for determining acoustical frequency data for the combustor, and a computing device configured for determining a combustor flame temperature based on the acoustical frequency data. The computing device is further configured for determining an existing fuel/air ratio in the combustor based on the combustor flame temperature, and for comparing the existing fuel/air ratio to a lean blow out fuel/air ratio. A lean blow out condition for the combustor is indicated when the existing fuel/air ratio is about equal to the lean blow out fuel/air ratio.

BRIEF DESCRIPTION OF THE DRAWINGS

Referring to the exemplary drawings wherein like elements are numbered alike in the several Figures:

FIG. 2 is a table summarizing the exemplary acoustical mode peak frequency data for each of the combustor cans, as well as the deviation from the median frequency thereof;

DETAILED DESCRIPTION OF THE INVENTION

Disclosed herein is a method and system for predicting when a turbine combustor is approaching a lean blow out condition, and to thereafter generate an alarm to indicate that corrective action is to be taken in order to reduce the risk of flame blowing out in the combustor. Briefly stated, the methodology described herein is based on measuring the frequency of one of the acoustic modes (e.g., a standing wave which is generated at resonance frequencies of combustor) occurring inside the combustion chamber. This acoustic mode travels in a direction that is transverse to the axis of the combustion liner, and the frequency of this mode is determined by the geometric dimensions of the combustor as well as the speed of sound of the gas inside the combustion chamber.

The speed of sound of the gas may in turn be calculated from the gas temperature and gas properties. Thus, by measuring the resonant frequency and by knowing the combustor dimensions and gas properties, the temperature of the can be determined. Since the temperature of the gas products is dependent on the fuel/air ratio that exists inside the combustor, the fuel/air ratio can then be determined from the known temperature. In turn, the fuel/air ration is indicative of how close the combustor is to a lean blow out condition. Advantageously, the methodology discussed herein utilizes a simplified approach for determining the real time fuel/air ratio inside a combustor and comparing it to the lean blow out limit to determine the likelihood of a blow out.

As discussed in further detail in pending application Ser. No. 10/856,773 (assigned to the assignee of the present application), the following expression describes the relationship between acoustic mode frequency of a combustor can and combustor flame temperature:

$$f = \frac{1.841\sqrt{(1.3)(286)(T_{flame})}}{\pi D}$$

Alternatively, this equation could be expressed more simply as:

$$f = \text{const}\sqrt{T_{flame}}$$

In other words, the acoustic mode frequency is proportional to the square root of flame temperature within the combustion liner.

Figure 1:
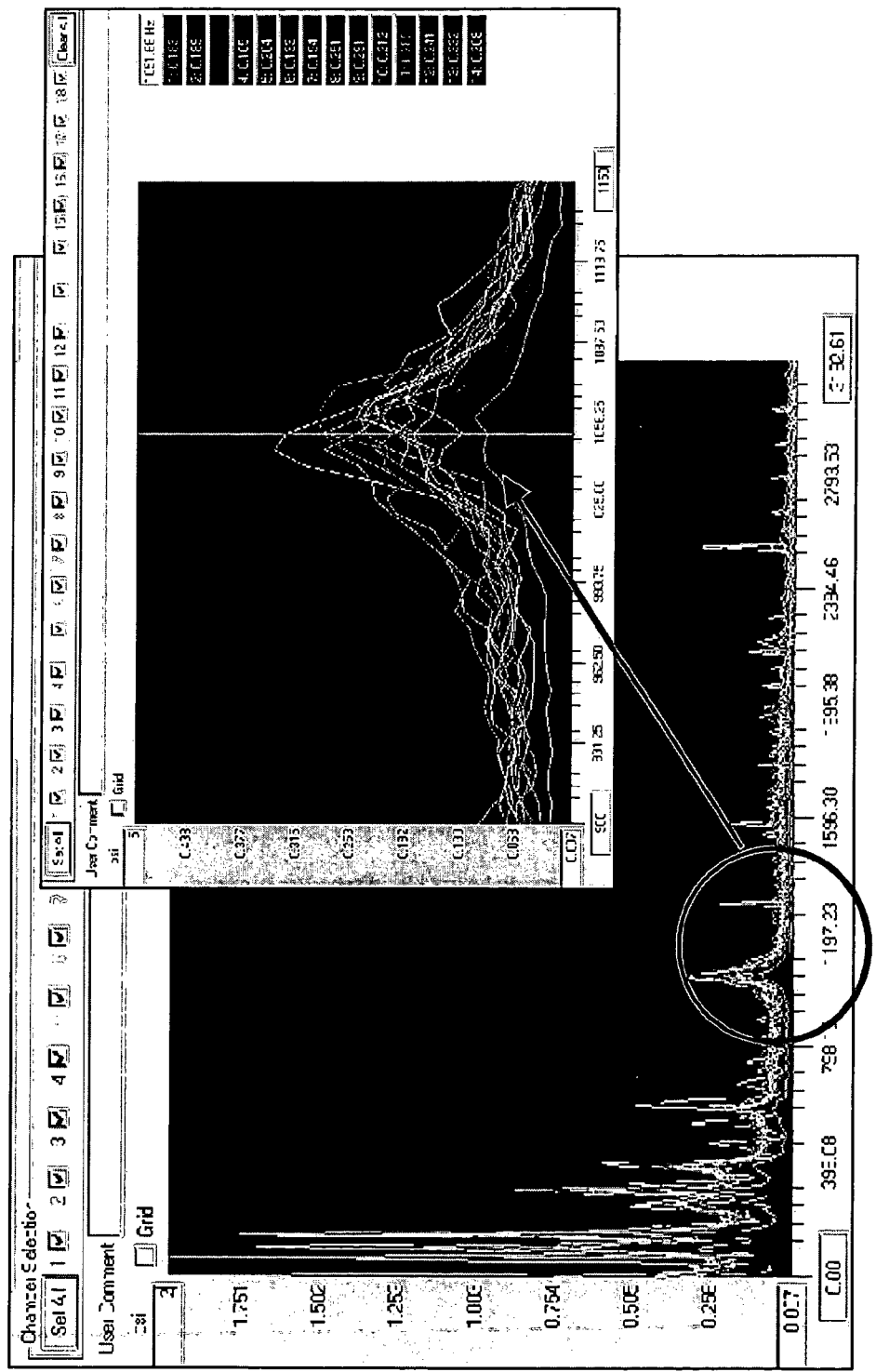
FIG. 1 is a computer screen shot of an exemplary fast Fourier transform (FFT) of the acoustical frequency data of a plurality of combustor cans.

Referring now to FIG. 1, there is shown a computer generated display of a frequency versus amplitude plot for each of a plurality of combustor cans of a gas turbine generator device. The plots may be generated, for example, by performing a fast Fourier transform (FFT) of frequency sensor data from each of the combustor cans. Of particular interest is the frequency spectral data in the acoustical range (e.g., from about 900 Hz to about 1100 Hz), as shown more clearly in the inset portion of FIG. 1. Using this frequency data, a median frequency is then determined which, in the case of the exemplary data shown in FIG. 1, turns out to be 1020.38 Hz.

The median frequency is used in conjunction with the present disclosure as it is representatively close to the average behavior for the turbine machine, but, at the same time, would not be erroneously biased by bad sensor readings from one or more of the combustion cans. Accordingly, any changes that take place in the machine's operational state would be reflected in this median frequency. On the other hand, if an event occurs in a single combustion can, the effects thereof would not be reflected in the median frequency, as it was presumably an event that is unique to that individual can and thus did not impact the other cans on the machine. It will be appreciated that the boundary acoustical frequency values (FT_low_freq of about 900 Hz and FT_high_freq of about 1100 Hz) are exemplary values only and may vary according to the specific combustor geometry.

Figure 3:
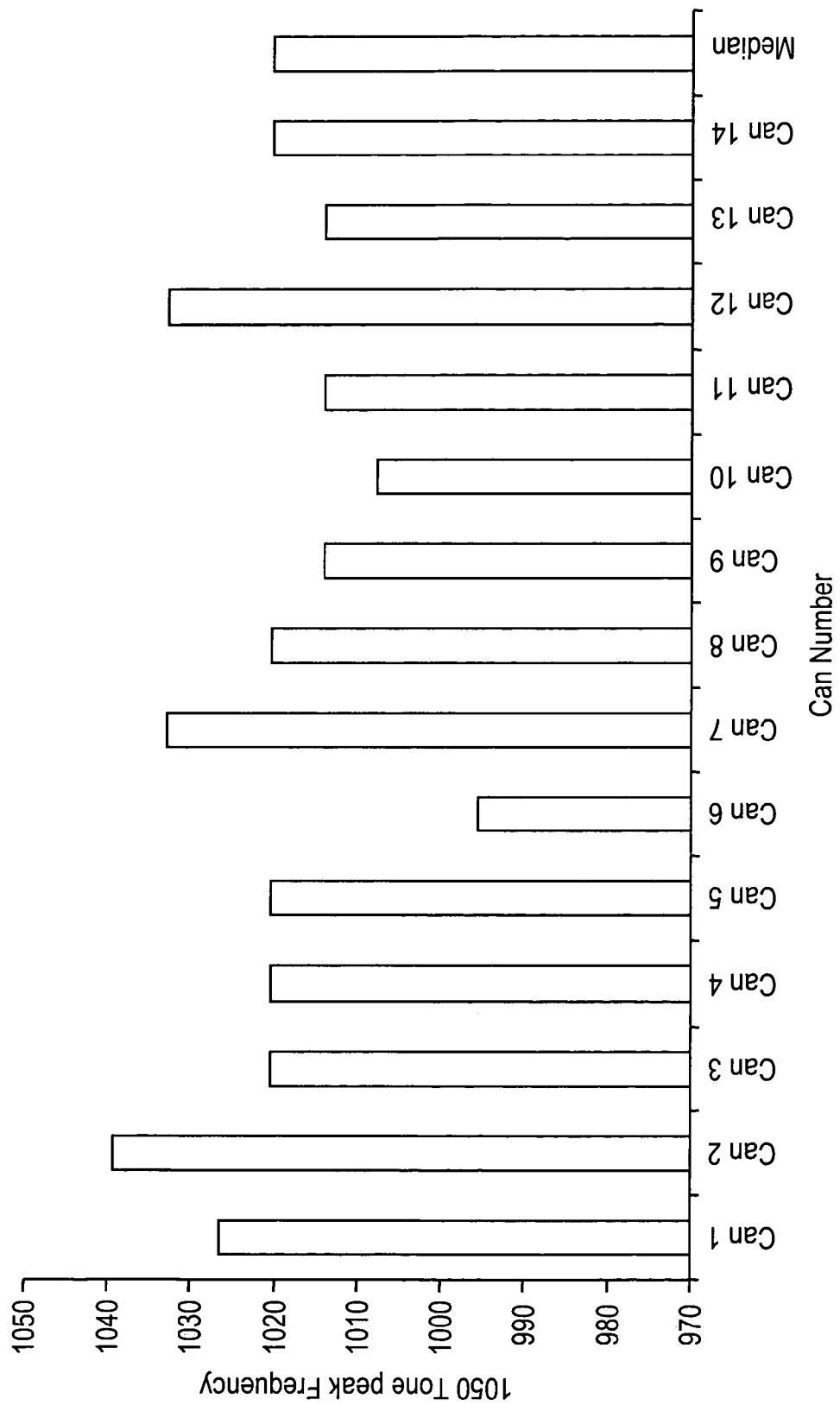
FIG. 3 is a bar graph illustrating the acoustical mode peak frequency for each of the combustor cans, as well as the median frequency thereof.
Figure 4:
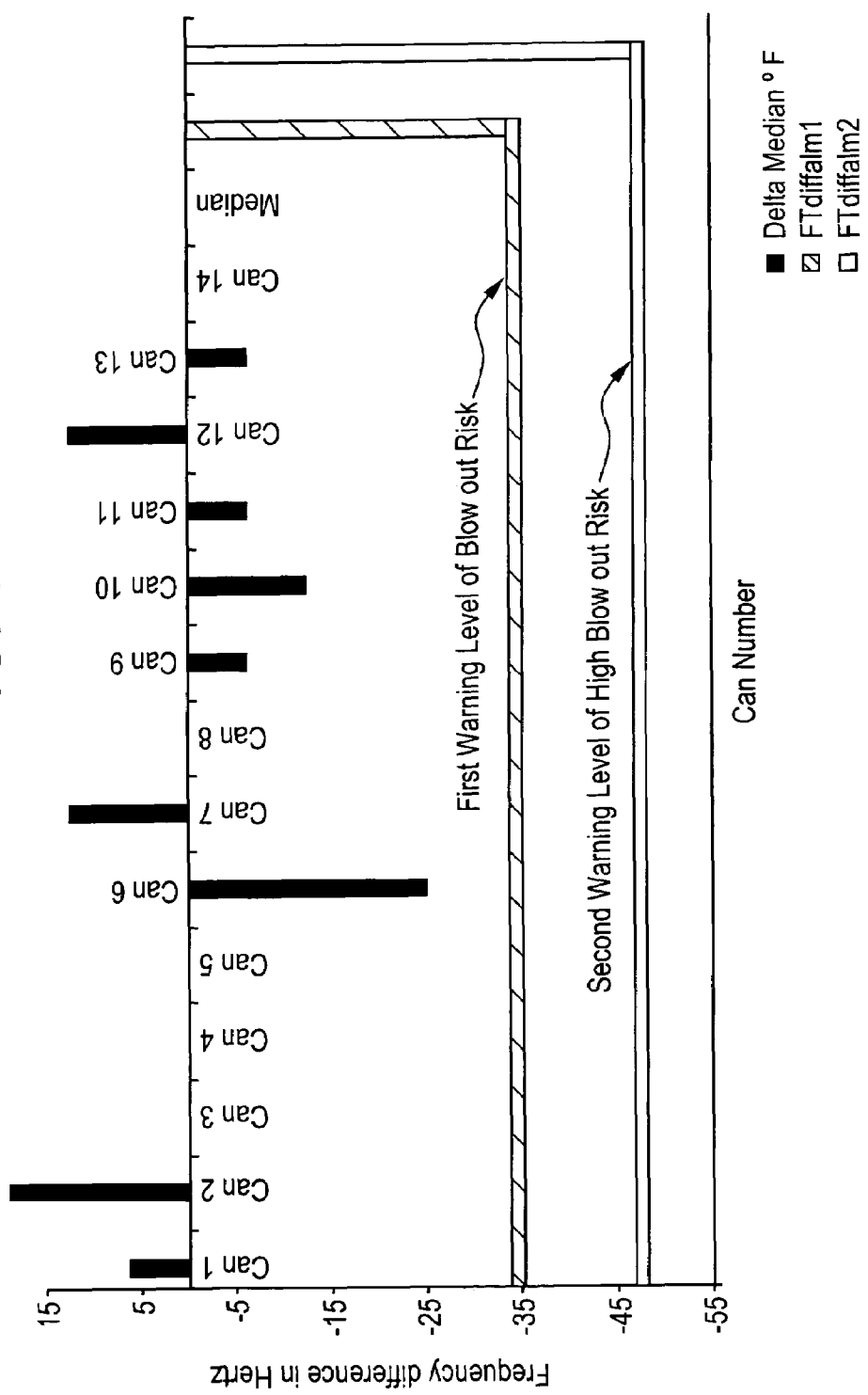
FIG. 4 is a bar graph illustrating the deviation (delta) from the median frequency for each of the combustor cans, as well as the threshold frequency deviation levels for a first and a second blow out risk warning to be generated.

FIG. 2 is a table summarizing the exemplary acoustical mode peak frequency data for each of the combustor cans calculated at a given moment during operation of the turbine, as well as the deviation (delta) from the median frequency thereof. This data is also presented in the bar graph of FIG. 3. In FIG. 4, the bar graph for each can depicts the difference between the frequency of the can and the median frequency. If the difference is positive, then the can is running hotter then with respect to the median; if negative, the can is running cooler with respect to the median. Thus, it can be seen, for example, that since the frequency difference of can 1 is about +7 Hz with respect to the median frequency, then can 1 is running hotter than the median. In contrast, since the frequency difference of can 6 is about −25 Hz with respect to the median frequency, then can 6 is running cooler than the median.

As discussed above, the magnitude of the frequency difference is proportional to the square root of the temperature difference of each can relative to the median. If the gas turbine device is a lean combustion system, cans that are running at a temperature less than the median therefore have a greater risk of having a lean flame out which will result the machine tripping. In accordance with an embodiment of the invention, a first alarm level is defined to indicate there is a risk of blow out whenever any of the combustors crosses this threshold relative to the median. A second alarm level is further defined to indicate a "high risk" of blow out whenever any of the combustors crosses this threshold relative to the median. Both first and second alarm levels are shown in the bar graph of FIG. 4.

The acoustic mode frequencies are not always present in a combustion system, particularly at no load and low loading conditions, for instance. In order to deter the generation of false alarms with regard to detecting a lean blow out condition, it is desirable to first verify that the acoustic mode is present in the system, and further that there is a sufficient signal-to-noise ratio of the acoustic mode frequency data before enable the main blow out detection algorithm. An example of such an enabling algorithm 500 is illustrated in the flow diagram of FIG. 5.

Beginning at block 502, dynamic pressure data is sampled from each of the combustion cans in the gas turbine system. An FFT is then performed on the pressure data, as shown in block 504, to generate frequency spectral data for the cans (similar to the exemplary display shown in FIG. 1). Then, for each can, a determination is made as to the peak amplitude of that portion of the frequency spectrum in the defined acoustic mode range, as shown in block 506. As further indicated in the table of FIG. 5, this range is user definable between a lower value (FT_low_Freq) and an upper value (FT_high_Freq). Again, in the example illustrated, the lower value of the acoustic mode range is about 900 Hz, while the upper value of the acoustic mode range is about 1100 Hz. In block 508, the median frequency is determined as described earlier, including the corresponding amplitude of the median frequency (FTmedAMP). So long as the amplitude of the median frequency exceeds a threshold value (CDAFTE), also a user configurable constant (e.g., 0.1 PSI), then sufficient signal amplitude is present. The enabling algorithm 500 will thus proceed from decision block 510 to block 512 in order to execute the main blow out detection algorithm, described below. However, if the amplitude of the median frequency does not exceed the threshold value, the acoustic mode is deemed not to be present. Consequently, the enabling algorithm loops back to the beginning at block 502 to repeat the sampling of the dynamic pressure data, FFT analysis and determination of sufficient amplitude of the median frequency.

Figure 6:
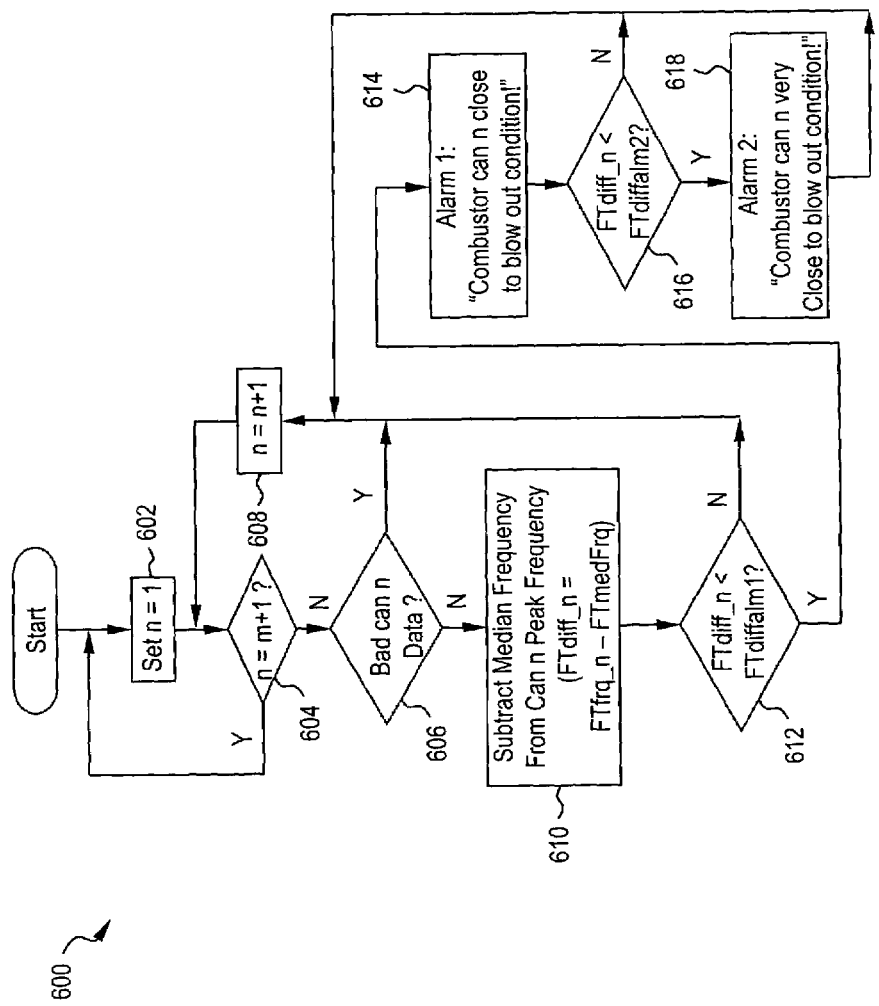
FIG. 6 is a flow diagram illustrating a method for predicting a lean blow out condition for gas turbine combustion cans, in accordance with an embodiment of the invention.

Assuming the threshold conditions of the enabling algorithm are eventually satisfied, FIG. 6 illustrates an algorithm 600 representing a method for predicting a lean blow out condition for gas turbine combustion cans, in accordance with an embodiment of the invention. As shown in block 602, a counter is used to initially set the variable n (representing a given combustor can number) to 1. Decision block 604 is used to determine whether the current value of n exceeds a number, m, of combustor cans, signifying that each can in the system has been analyzed and, if so, n is reset to 1 to restart the sequence. Where n has just been initialized to 1, the process flow would naturally move from decision block 604 to decision block 606.

Decision block 606 allows for the possibility that a particular can has bad sensor data, in which case the frequency information therefrom is not used in the blowout prediction process. Accordingly, if can n has bad data associated therewith (a condition that may be dynamically detected or, alternatively, preprogrammed into the algorithm), the counter is incremented as shown in block 608, and the algorithm then returns to decision block 604 to see whether the counter needs to be reset. Assuming, however, that the can n data is good, the method proceeds to block 610 where the median frequency is subtracted from the can n peak frequency to produce a differential frequency (FTdiff_n) for can n. This differential frequency is compared to a first alarm frequency level (FTdiffalm1) as was depicted in the exemplary graph of FIG. 4. If, at decision block 612, it is determined that the differential frequency (FTdiff_n) is not less than the value of the first alarm frequency level (FTdiffalm1), then it is determined that a lean blow out potential does not presently exist within can n. The method then proceeds back to block 608 where the counter is incremented for analysis on the next can.

On the other hand, if the differential frequency (FTdiff_n) is less than the value of the first alarm frequency level (FTdiffalm1), then it is determined that a lean blow out potential does presently exist within can n. The algorithm 600 proceeds to block 614, where a first level alarm is triggered. The first level alarm can be implemented by any suitable means including, but not limited to, audible alarm sounds, lights, visual message displays and combinations thereof. In the example illustrated, the first level alarm is associated with a message to the effect that "Combustor can n is close to a blow out condition!"

In addition to executing the first level alarm indication, the algorithm 600 will further check to see whether the second level alarm threshold has been reached. Specifically, decision block 616 determines whether the differential frequency (FTdiff_n) is also less than the value of the second alarm frequency level (Ftdiffalm2). If not, the method returns to the counter increment block 608. However, if FTdiff_n is in fact also less than the value of Ftdiffalm2, then algorithm 600 proceeds to block 618 to trigger a second level alarm. While the second level alarm may be implemented in a manner similar to the first level alarm, it further provides a "higher" level of blow out risk indication than the first level alarm. For example, a message such as "Combustor can n is very close to a blow out condition!" may be displayed. Regardless of whether the second level alarm is triggered for a given can, the process will return to counter increment block 608.

The determination of the particular values for the first and second alarm frequency levels (i.e., the blow out margins) will depend on the present load configuration of the gas turbine, since calculation of the blow out margin is based on the combustor flame temperature. For example, when the combustor is running relatively hotter the blow out margin is increased, and when the combustor is running relatively cooler the blow out margin is decreased. The blow out margin(s) may be determined using the following expression:

$$FTdiffalm1 = FTmarmin + [FTmedfq - Ftmin][(FTmarmax - FTmarmin)/(FTmax - FTmin)]$$

Figure 7:
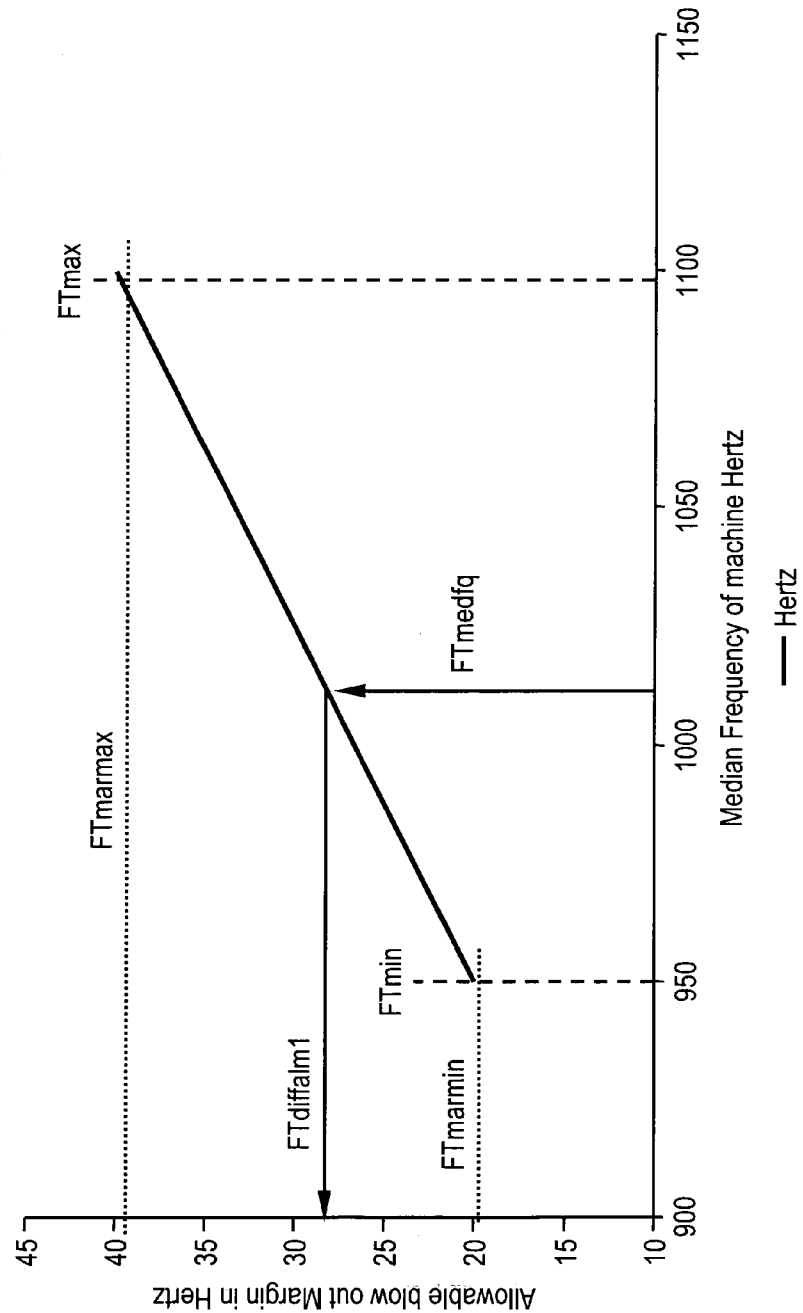
FIG. 7 is a graph illustrating the calculation of the blow out margin as a function of the combustor acoustical frequency.

FTmarmin is a constant representing a minimum desired blow out margin (in Hz), FTmarmax is a constant representing a maximum desired blow out margin (in Hz), FTmin is a constant representing the frequency corresponding to FTmarmin, FTmax is a constant representing the frequency corresponding to FTmarmax, FTmedfq is the calculated median frequency for the machine (in Hz), and FTdiffalm1 is the calculated allowable blow out margin representing the first level alarm. This relationship is also graphically illustrated in FIG. 7. In addition, the second level alarm frequency is based on the first level alarm frequency as follows:

$$FTdiffalm2 = FTdiffalm1 - FTdiffdb$$

where FTdiffdb is a constant representing the margin difference (in Hz) between the first level alarm frequency and the second level alarm frequency.

Figure 5:
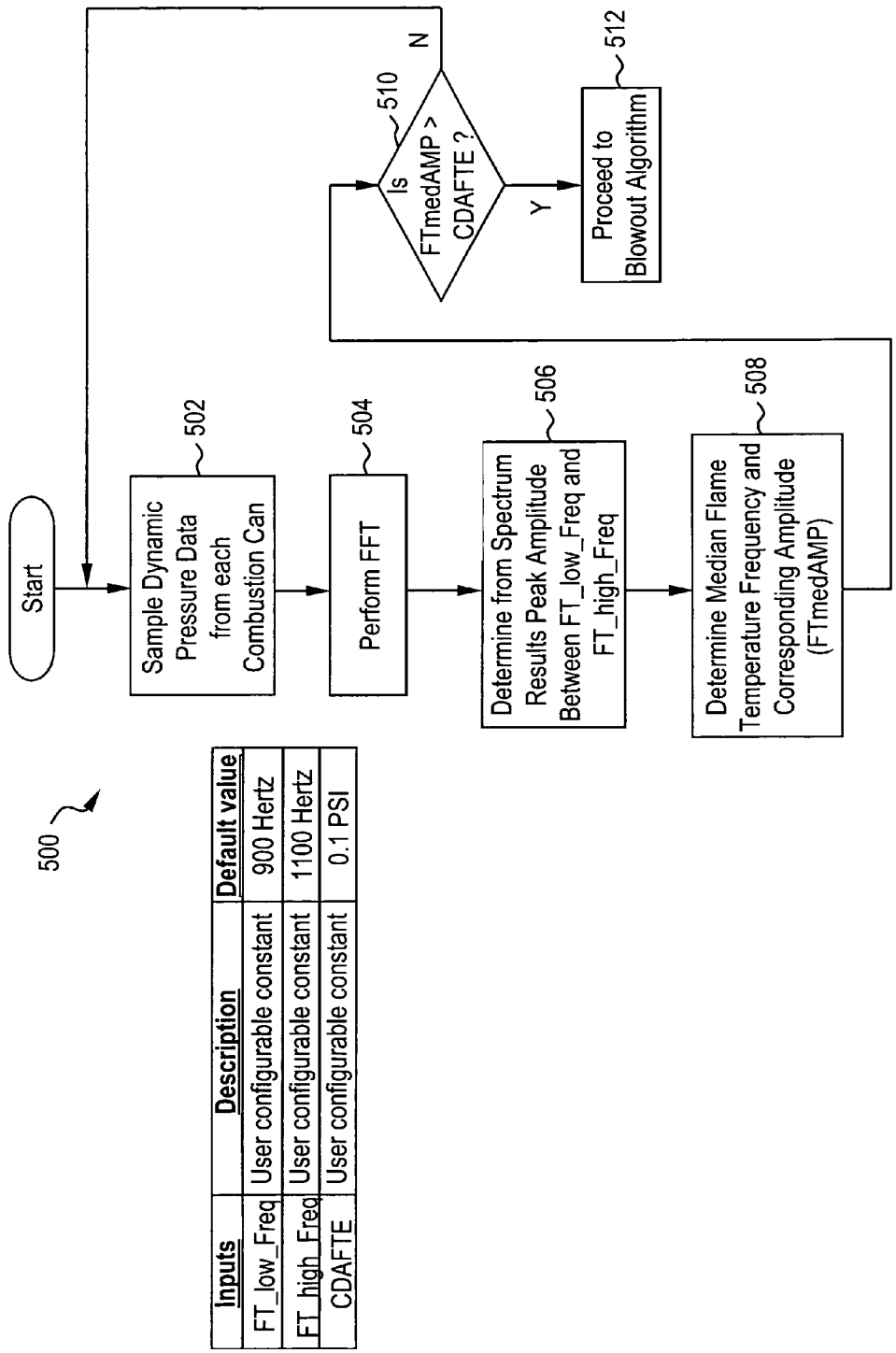
FIG. 5 is a flow diagram of an enabling algorithm for determining the sufficiency of acoustic mode frequency signals, in accordance with an embodiment of the invention.
Figure 8:
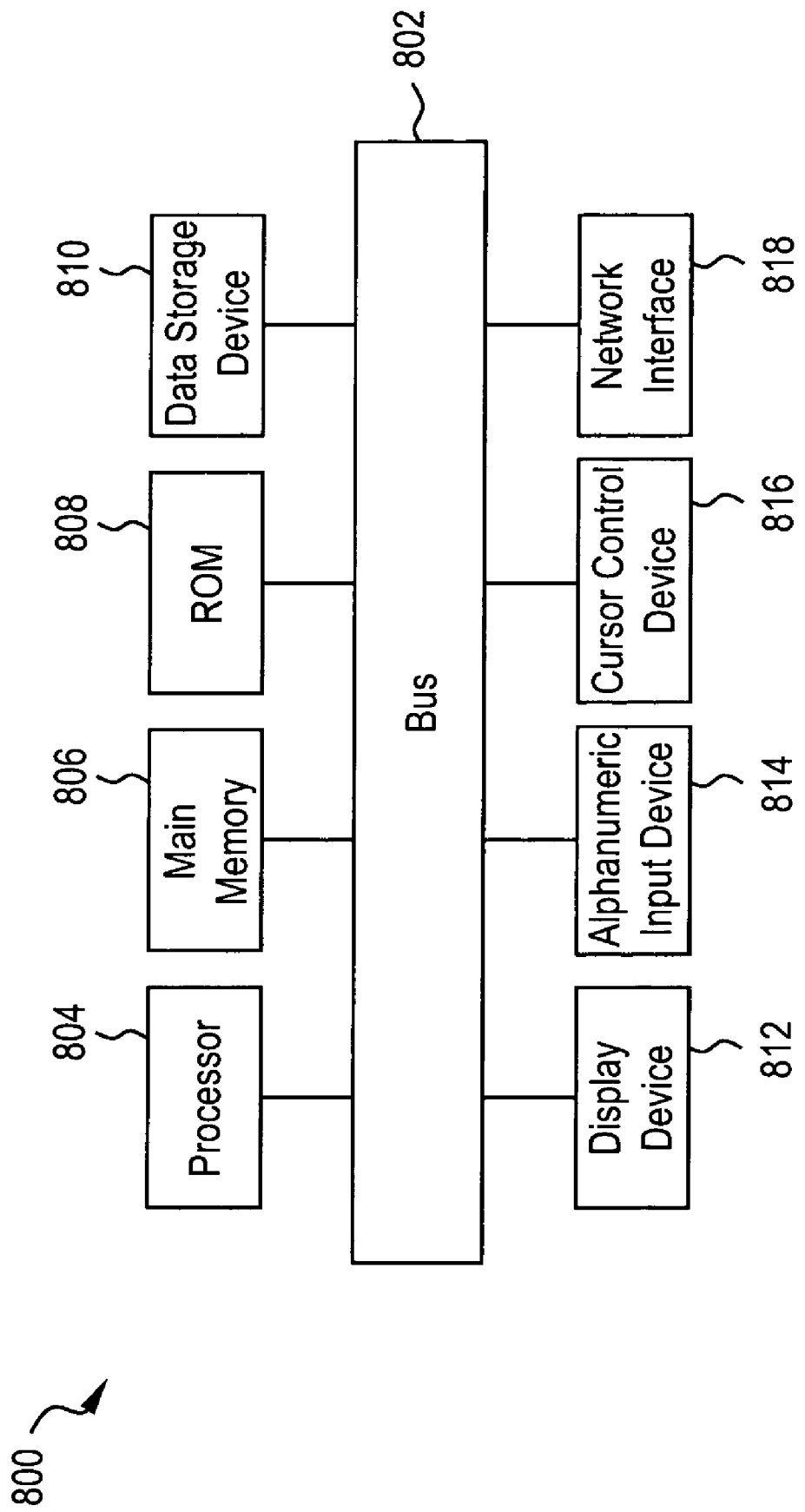
FIG. 8 is an exemplary computing system in which the method of FIGS. 4 and 5 may be implemented.

FIG. 8 is a block diagram of an embodiment of an exemplary computer system 800 in which the method of FIGS. 5 and 6 may be implemented. The computer system 800 illustrated in FIG. 8 is intended to represent a broad range of computer systems, and thus alternative computer systems may include more, fewer and/or different components. As shown in FIG. 8, the computer system 800 includes a bus 802 or other communication device to communicate information, as well as a processor 804 coupled to the bus 802 to process information. Although the computer system 800 is illustrated with a single processor, multiple processors and/or co-processors may also be included.

A random access memory (RAM) or other type of dynamic storage device 806 (depicted as main memory in FIG. 8) is coupled to the bus 802 to store information and instructions to be executed by processor 804. The main memory 806 may also be used to store temporary variables or other intermediate information during execution of instructions by a processor 802. A read only memory (ROM) and/or other static data storage device 808 is also shown coupled to bus 802 for storing static information and other instructions carried out by processor 804, while data storage device 810 (e.g., a magnetic disk or optical disc and corresponding drive) is coupled to bus 802 for storing information and instructions.

The computer system 800 may also be coupled via the bus 802 to a display device 812, such as a cathode ray tube (CRT) or liquid crystal display (LCD), for displaying information to a computer user. An alphanumeric input device 814, including alphanumeric and other keys, may be coupled to the bus 802 to allow a user to communicate information and command selections to the processor 804. Another type of user input device that may be associated with computer system 800 is a cursor control device 816, such as a mouse, a trackball, or cursor direction keys to communicate direction information and command selections to processor 802, as well as to control cursor movement on the display device 812. In addition, a network interface 818 may be used to provide access to a network, such as a local area network.

Figure 9:
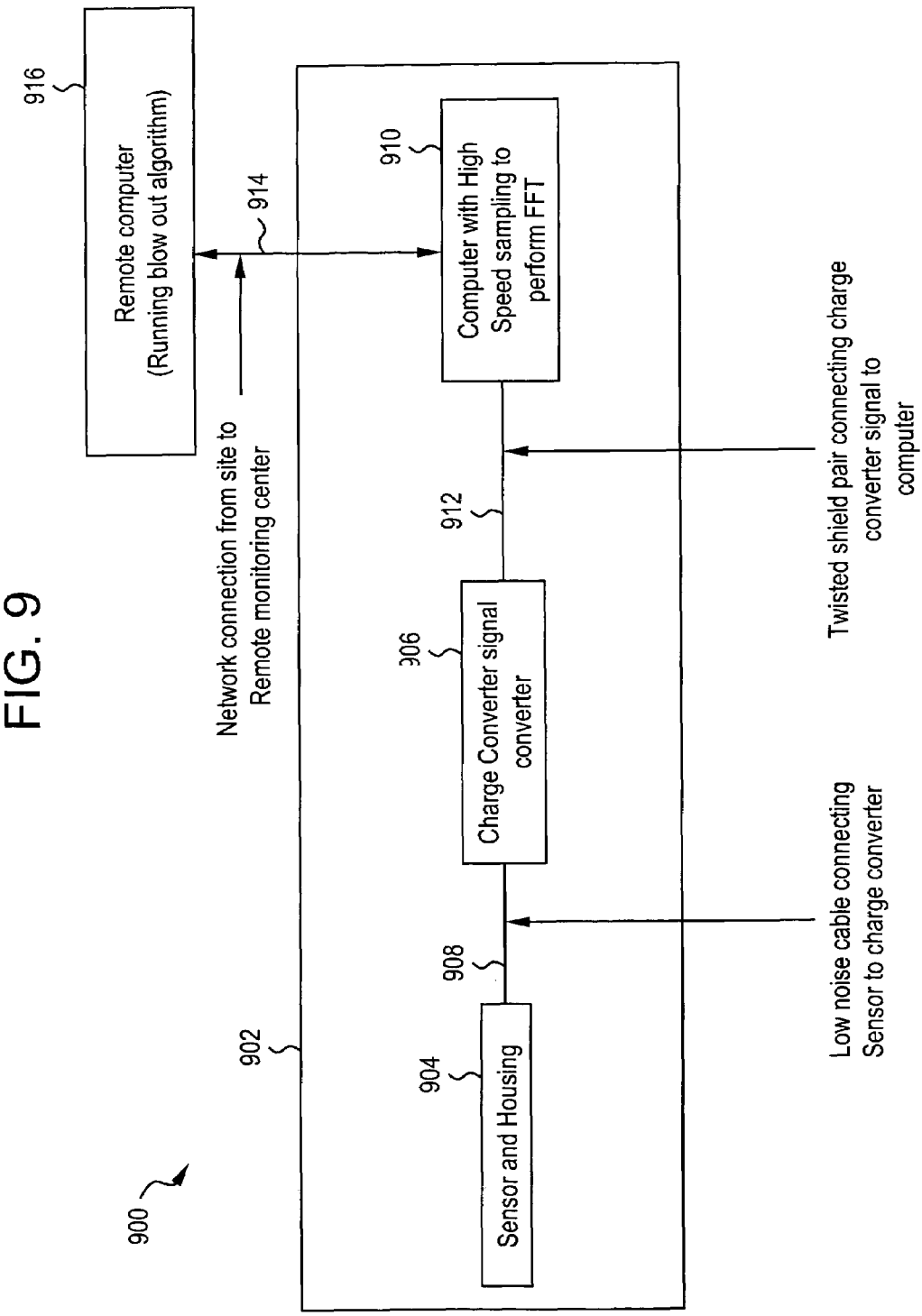
FIG. 9 is a schematic block diagram of an exemplary gas turbine system in which the method of FIGS. 4 and 5, in conjunction with the exemplary computing system of FIG. 8 may be implemented.

Finally, FIG. 9 is a schematic block diagram of an operating environment for an exemplary gas turbine system 900 in which the method of FIGS. 4 and 5, in conjunction with the exemplary computing system of FIG. 8 may be implemented. At the physical site 902 of the turbine, the sensor(s) within the combustion can housing 904 are in communication with a charge converter/signal converter 906, such as through a low-noise cable 908, for example. The charge converter signal is in turn communicated to a local computer 910 through a twisted shield pair 912, for example. The local computer 910 preferably includes high-speed sampling capability for performing fast Fourier transforms. The local site 902 may have a network connection 914 so that the local computer 910 can communicate with a remote computer 916 located at a monitoring center that runs the blow out algorithm.

In view of the above, the present method embodiments may therefore take the form of computer or controller implemented processes and apparatuses for practicing those processes. The disclosure can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits. A technical effect of the executable instructions is to implement the exemplary method described above and illustrated in FIGS. 5 and 6.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for determining a lean blow out condition for a combustor, the method comprising:
    determining acoustical frequency data for the combustor in a direction transverse to a flow within the combustor;
    determining a combustor flame temperature based on said acoustical frequency data in the direction transverse to the flow within the combustor;
    determining an existing fuel/air ratio in said combustor based on said combustor flame temperature; and
    comparing said existing fuel/air ratio to a lean blow out fuel/air ratio, wherein a lean blow out condition for the combustor is indicated when said existing fuel/air ratio is about equal to said lean blow out fuel/air ratio.

2. The method of claim 1, wherein said determining acoustical frequency data further comprises:
    determining a peak frequency for each of a plurality of combustor cans within an acoustical frequency range;
    determining a median frequency for said plurality of peak frequencies of said combustor cans; and
    subtracting said median frequency from said peak frequencies for each of said combustor cans and comparing a resulting differential frequency value therebetween to a calculated first blow out alarm level, said first blow out alarm level corresponding to a frequency less than that of said median frequency.

3. The method of claim 2, wherein said first blow out alarm level is calculated as a function of the value of said median frequency.

4. The method of claim 3, further comprising comparing said differential frequency value to a calculated second blow out alarm level, said second blow out alarm level corresponding to a frequency less than that of said first blow out alarm level.

5. The method of claim 3, further comprising activating a first level alarm whenever a differential frequency value for a given combustor can is less than or equal to said calculated first blow out alarm level.

6. The method of claim 4, further comprising activating a second level alarm whenever a differential frequency value for a given combustor can is less than or equal to said calculated second blow out alarm level.

7. A method for determining a lean blow out condition for a combustor, the method comprising:
    gathering dynamic pressure data for each of a plurality of combustor cans;
    determining frequency spectral data from said dynamic pressure data;
    determining a transverse frequency mode based on the frequency spectral data; determining a peak within the transverse frequency mode for each of said combustor cans, said peak frequencies indicative of an operating temperature within corresponding combustor cans;

determining a median frequency for said peak frequencies;

subtracting said median frequency from said peak frequencies for each of said combustor cans and comparing a resulting differential frequency value therebetween to a calculated first blow out alarm level, said first blow out alarm level corresponding to a frequency less than that of said median frequency;

generating a first alarm level indication for a given combustor can whenever said differential frequency value for said given combustor can is less than or equal to said first blow out alarm level.

8. The method of claim 7, further comprising comparing said differential frequency value to a calculated second blow out alarm level, said second blow out alarm level corresponding to a frequency less than that of said first blow out alarm level.

9. The method of claim 8, further comprising generating a second level alarm indication whenever a differential frequency value for a given combustor can is less than or equal to said calculated second blow out alarm level.

10. The method of claim 7, further comprising confirming that the amplitude of said median frequency meets a threshold level prior to said subtracting said median frequency from said peak frequencies, and prior to generating any first alarm level indications.

11. The method of claim 7, wherein said determining frequency spectral data from said dynamic pressure data further comprises taking a fast Fourier transform of said dynamic pressure data of each can.

12. The method of claim 9, further comprising calculating said first blow out alarm level in accordance with the following expression:

$$FTdiffalm1 = FTmarmin + [FTmedfq - FTmin][(FTmarmax - FTmarmin)/(FTmax - FTmin)];$$

wherein FTmarmin is a constant representing a minimum desired blow out margin, FTmarmax is a constant representing a maximum desired blow out margin, FTmin is a constant representing the frequency corresponding to FTmarmin, FTmax is a constant representing the frequency corresponding to FTmarmax, FTmedfq is the calculated median frequency for the machine (in Hz), and FTdiffalm1 is the calculated allowable blow out margin representing said first blow out alarm level.

13. The method of claim 12, further comprising calculating said second blow out alarm level in accordance with the following expression:

$$FTdiffalm2 = FTdiffalm1 - Ftdiffdb;$$

where FTdiffdb is a constant representing the margin difference between the first level alarm frequency and the second level alarm frequency.

14. The method of claim 7, wherein said acoustical frequency range is from about 900 Hz to about 1100 Hz.

15. A system for determining a lean blow out condition for a combustor, comprising:

a sensing device configured for determining acoustical frequency data for the combustor in a direction transverse to a flow within the combustor;

a computing device configured for determining a combustor flame temperature based on said acoustical frequency data in the direction transverse to the flow within the combustor;

said computing device further configured for determining an existing fuel/air ratio in said combustor based on said combustor flame temperature, and for comparing said existing fuel/air ratio to a lean blow out fuel/air ratio;

wherein a lean blow out condition for the combustor is indicated when said existing fuel/air ratio is about equal to said lean blow out fuel/air ratio.

16. The system of claim 15, wherein said computing device further comprises:

a local computing device configured for said determining acoustical frequency data by determining a peak frequency for each of a plurality of combustor cans within an acoustical frequency range, determining a median frequency for said plurality of peak frequencies of said combustor cans, and subtracting said median frequency from said peak frequencies for each of said combustor cans; and a remote computing device in communication with said local computing device, said remote computing device configured to comparing a resulting differential frequency value therebetween to a calculated first blow out alarm level, said first blow out alarm level corresponding to a frequency less than that of said median frequency.

17. The system of claim 16, wherein said first blow out alarm level is calculated as a function of the value of said median frequency.

18. The system of claim 17, wherein said remote computing device is further configured to compare said differential frequency value to a calculated second blow out alarm level, said second blow out alarm level corresponding to a frequency less than that of said first blow out alarm level.

19. The system of claim 17, wherein said remote computing device is further configured to activate a first level alarm whenever a differential frequency value for a given combustor can is less than or equal to said calculated first blow out alarm level.

20. The system of claim 18, wherein said remote computing device is further configured to activate a second level alarm whenever a differential frequency value for a given combustor can is less than or equal to said calculated second blow out alarm level.

* * * * *